(12) United States Patent
Goto

(10) Patent No.: US 11,397,257 B2
(45) Date of Patent: Jul. 26, 2022

(54) RADAR APPARATUS AND CORRECTION VALUE CALCULATION METHOD

(71) Applicant: DENSO TEN Limited, Kobe (JP)

(72) Inventor: Kunihiro Goto, Kobe (JP)

(73) Assignee: DENSO TEN LIMITED, Kobe (JP)

(*) Notice: Subject to any disclaimer, the term of this patent is extended or adjusted under 35 U.S.C. 154(b) by 280 days.

(21) Appl. No.: 16/717,083

(22) Filed: Dec. 17, 2019

(65) Prior Publication Data
US 2020/0278439 A1 Sep. 3, 2020

(30) Foreign Application Priority Data

Feb. 28, 2019 (JP) .............................. JP2019-036666

(51) Int. Cl.
| | | |
|---|---|---|
| *G01S 13/58* | (2006.01) | |
| *G01S 7/40* | (2006.01) | |
| *G01S 13/88* | (2006.01) | |
| *H01Q 17/00* | (2006.01) | |

(52) U.S. Cl.
CPC ............... *G01S 13/58* (2013.01); *G01S 7/40* (2013.01); *G01S 13/88* (2013.01); *H01Q 17/001* (2013.01)

(58) Field of Classification Search
CPC ............. G01S 13/58; G01S 13/88; G01S 7/40
USPC .................................. 342/109, 125, 147, 175
See application file for complete search history.

(56) References Cited

U.S. PATENT DOCUMENTS

2019/0131703 A1* 5/2019 Meyer .................... H01Q 21/22

FOREIGN PATENT DOCUMENTS

| JP | 2007-121165 A | 5/2007 |
|---|---|---|
| JP | 2010-071889 A | 4/2010 |
| JP | 2016-003649 A | 1/2016 |

\* cited by examiner

*Primary Examiner* — Bo Fan
(74) *Attorney, Agent, or Firm* — Oliff PLC

(57) ABSTRACT

A radar apparatus includes: a receiving unit including plural receiving antennas including an antenna element, and configured to receive incoming waves whose arrival directions are known; and a calculating unit configured to calculate a correction value for correcting an error component included in a received signal of the incoming waves received by the receiving unit based on the received signal, the correction value being depending on an azimuth of the antenna element.

4 Claims, 7 Drawing Sheets

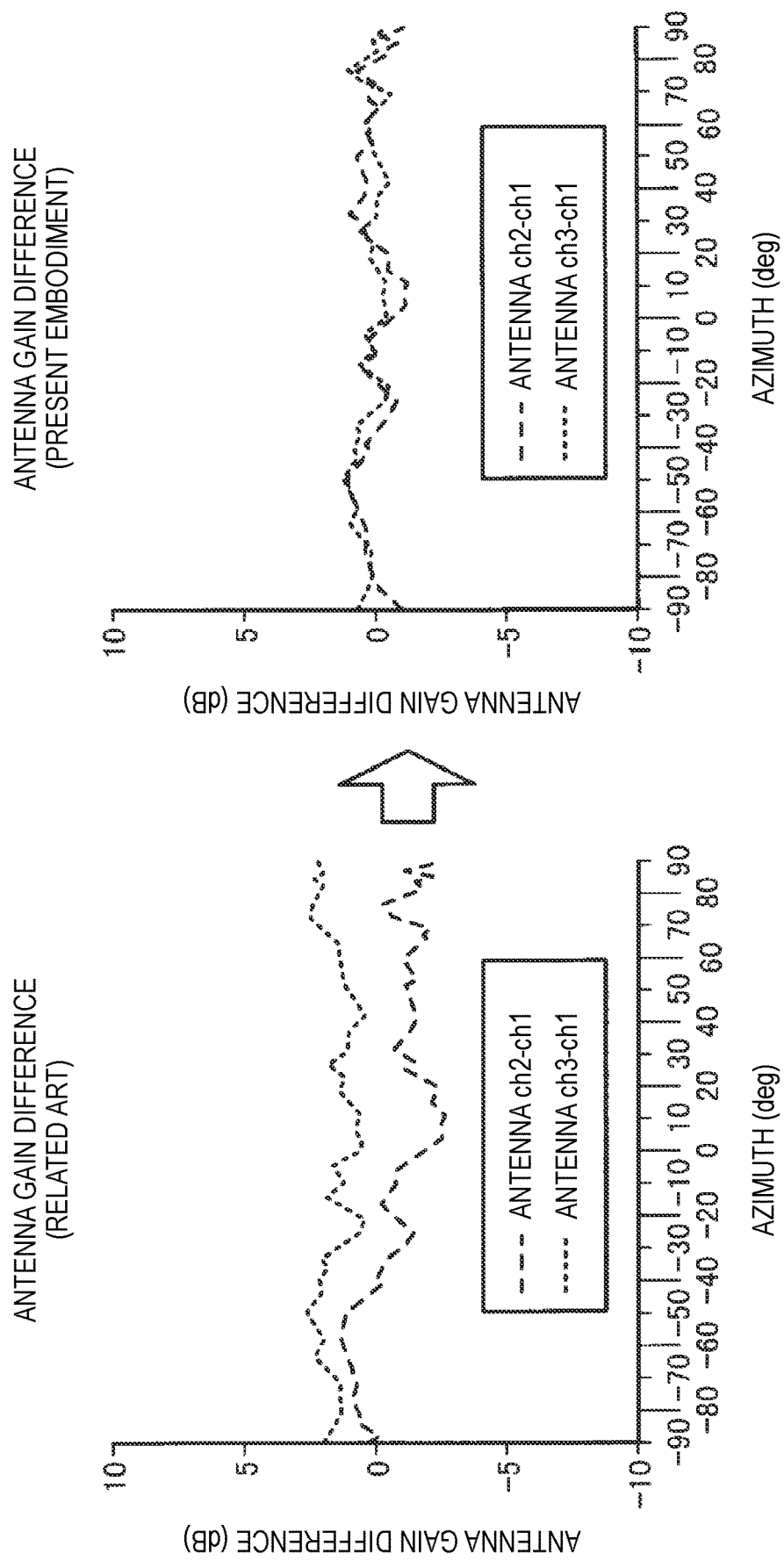

RADAR APPARATUS AND CORRECTION VALUE CALCULATION METHOD

CROSS-REFERENCE TO RELATED APPLICATIONS

This application is based upon and claims the benefit of priority from prior Japanese patent application No. 2019-036666, filed on Feb. 28, 2019, the entire contents of which are incorporated herein by reference.

BACKGROUND

Technical Field

The present invention relates to a radar apparatus and a correction value calculation method.

Related Art

With respect to a radar apparatus or the like, for example, there is a technique for estimating an arrival direction of a reflected wave of a transmitted wave reflected by a target based on a phase difference of the reflected wave. In this type of technique, an azimuth calculation is performed after correcting an electromagnetic coupling component among respective antenna elements from a received signal by signal processing (see, for example, JP-A-2016-003649).

SUMMARY

In the related art, a correction effect on the received signal is not always obtained sufficiently, and there is room for improving accuracy of the azimuth calculation.

The present disclosure has been made in view of the above circumstances and an object thereof is to provide a radar apparatus and a correction value calculation method capable of improving accuracy of an azimuth calculation.

According to an aspect of the present disclosure, there is provided a radar apparatus including: a receiving unit including plural receiving antennas including an antenna element, and configured to receive incoming waves whose arrival directions are known; and a calculating unit configured to calculate a correction value for correcting an error component included in a received signal of the incoming waves received by the receiving unit based on the received signal, the correction value being depending on an azimuth of the antenna element.

According to the present disclosure, the accuracy of the azimuth calculation may be improved.

BRIEF DESCRIPTION OF DRAWINGS

Exemplary embodiment(s) of the present invention will be described in detail based on the following figures, wherein:

FIG. 4A shows gain differences of corrected received signals;

DETAILED DESCRIPTION

A radar apparatus and a correction value calculation method according to an embodiment will be described below with reference to the accompanying drawings. The present invention is not limited to the embodiment described below. Hereinafter, a case where the radar apparatus is a Frequency Modulated Continuous Wave (FM-CW) system will be described as an example, but the radar apparatus may be a Fast-Chirp Modulation (FCM) system.

Figure 1:
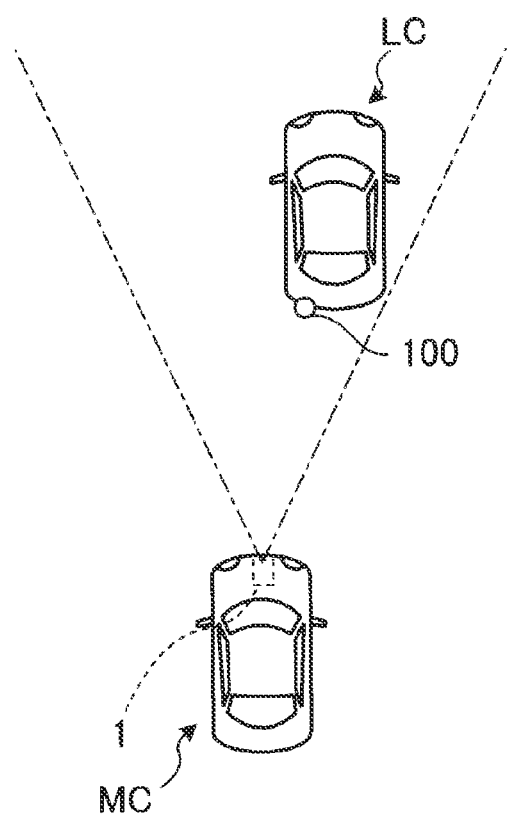
FIG. 1 illustrates an example of mounting a radar apparatus.

First, an outline of the radar apparatus and the correction value calculation method according to the embodiment will be described with reference to FIG. 1. FIG. 1 illustrates an example of mounting the radar apparatus. FIG. 1 illustrates a host vehicle MC in which the radar apparatus 1 according to the embodiment is mounted, and another vehicle LC in front of the host vehicle MC.

As illustrated in FIG. 1, the radar apparatus 1 is mounted in, for example, a front grille of the host vehicle MC, and detects a target (for example, the other vehicle LC) present in a traveling direction of the host vehicle MC. The radar apparatus 1 may be mounted on other places such as a front windshield, a rear grille, and left and right side portions (for example, left and right door mirrors).

As illustrated in FIG. 1, the radar apparatus 1 generates target data 100 corresponding to the target based on a reflected wave reflected by the other vehicle LC from a radio wave transmitted around the host vehicle MC. The target data 100 includes information such as a relative speed to the host vehicle MC, a distance to the other vehicle LC, and an azimuth of the other vehicle LC with respect to the host vehicle MC.

The radar apparatus 1 calculates the azimuth of the other vehicle LC by using, for example, an azimuth calculation algorithm such as a Multiple Signal Classification (MUSIC) method on a received signal based on incoming waves received by a plurality of antenna elements which is an array antenna or the like.

In general, a gain error and a phase error due to variations in characteristics of each antenna element, an error based on mutual coupling between the elements occurring between channels of receiving antennas, or the like occurs. These errors result in deterioration of estimation accuracy of the azimuth calculation.

Therefore, in general, in the radar apparatus, correction processing of correcting the received signal including the above-described error to an ideal signal which is an ideal received signal is performed. A correction value calculated in advance, for example, before product shipment is stored and applied to the received signal so as to perform the correction processing.

Here, a related-art correction value will be described. In the related-art correction value, for example, 15 known wave sources are set such that directions of a plurality of known wave sources viewed from the antenna elements are +20°, +10°, 0°, −10°, and −20°.

When an antenna number n=1, 2, . . . N, a known wave source azimuth $\theta=\theta_1, \theta_2, \ldots \theta_M$, a received signal of the azimuth $\theta$ received by the antenna n is $s_{n\theta}$, and an ideal signal which is an ideal received signal in the azimuth $\theta$ at the antenna n is $a_{n\theta}$, a received signal matrix S and an ideal signal matrix A are represented by Equations (1) and (2), respectively.

$$S = \begin{bmatrix} s_{1\theta_1} & \cdots & s_{1\theta_M} \\ \vdots & \ddots & \vdots \\ s_{N\theta_1} & \cdots & s_{N\theta_M} \end{bmatrix} \quad (1)$$

$$A = \begin{bmatrix} a_{1\theta_1} & \cdots & a_{1\theta_M} \\ \vdots & \ddots & \vdots \\ a_{N\theta_1} & \cdots & a_{N\theta_M} \end{bmatrix} \quad (2)$$

At this time, a correction value H may be expressed as $H=A \cdot S^+$ using a pseudo inverse matrix $S^+$ of the received signal matrix S. The received signal matrix $S=C \cdot \Gamma \cdot A$ may be calculated, where C is a matrix representing the mutual coupling between the elements, and $\Gamma$ is a matrix representing a phase difference and an amplitude difference between the channels of the receiving antennas. When M=N, the pseudo inverse matrix is a normal inverse matrix.

When the received signal $s=(s_{\theta 1}, s_{\theta 2}, \ldots s_{\theta M})^T$ is corrected, the received signal s is multiplied by the correction value H, and a corrected received signal s' is $s'=H \cdot s$.

Here, the correction value H is effective when, for example, the receiving antenna is a dipole antenna having a relatively small difference in amplitude characteristics for each azimuth. However, the correction effect may not be sufficiently obtained when a planar antenna or the like having a relatively large difference in amplitude characteristics for each azimuth is used as the receiving antenna.

This is caused by correcting a difference in amplitude characteristics for each azimuth of a beam pattern of the receiving antenna in addition to an error component due to the electromagnetic coupling between the elements to be corrected or the like.

Therefore, in a case of the planar antenna, a deviation between the actual received signal and the ideal signal is larger than that in a case of a pole antenna, and a sufficient correction effect cannot be obtained by the related-art correction processing. More specifically, in the related-art correction processing, correction of bringing the received signal closer to the ideal signal is mainly performed, and an error between the respective receiving antennas may not be corrected.

Therefore, in the correction value calculation method according to the embodiment, a correction value for removing an error component due to the beam pattern from the actual received signal is calculated. For example, in the correction value calculation method according to the embodiment, the correction value H obtained by normalizing the above-described received signal matrix S with an average amplitude of each column in the received signal matrix S is calculated.

That is, the error component based on the beam pattern may be removed from the corrected received signal s' by correcting the received signal s with the correction value H. That is, the received signal s obtained by the array antenna may be virtually brought close to the ideal signal obtained by an isotropic antenna.

Accordingly, the accuracy of the azimuth calculation may be improved by the correction value calculation method according to the embodiment. In the correction value calculation method according to the embodiment, the correction value H that does not consider an amplitude of the received signal s may be calculated. In this case, only a phase difference of the received signal s may be corrected by applying the correction value H to the received signal s.

Details of the correction value according to the present embodiment will be described below.

Figure 2:
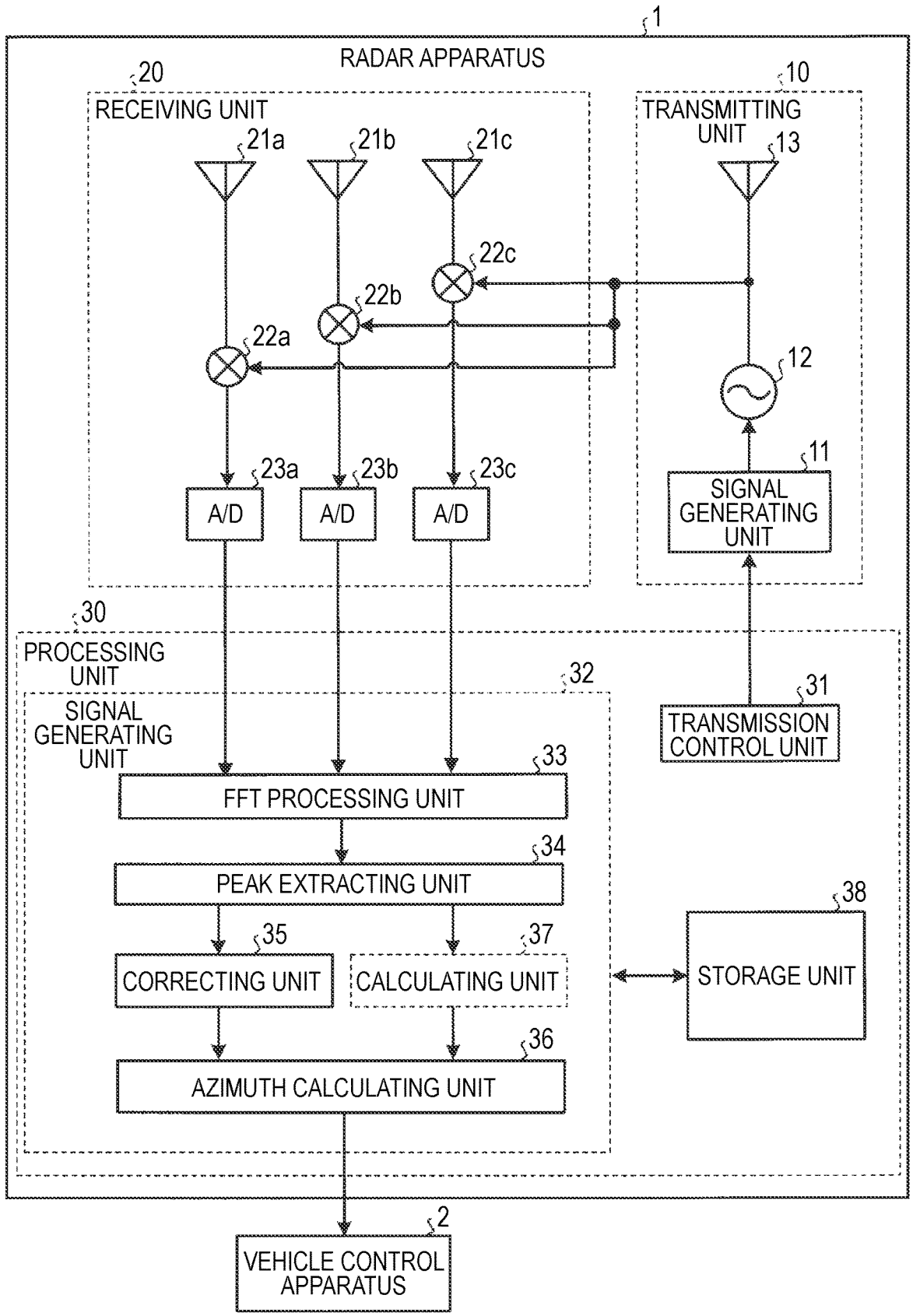
FIG. 2 is a block diagram of the radar apparatus.

Next, a configuration of the radar apparatus 1 according to the embodiment will be described in detail with reference to FIG. 2. FIG. 2 is a block diagram showing the configuration of the radar apparatus 1 according to the embodiment. In FIG. 2, only components necessary for describing features of the present embodiment are represented by functional blocks, and a description of general components is omitted.

As illustrated in FIG. 2, the radar apparatus 1 includes a transmitting unit 10, a receiving unit 20, and a processing unit 30. The radar apparatus 1 is connected to a vehicle control apparatus 2 configured to control operation of the host vehicle MC.

The vehicle control device 2 performs vehicle control which is a Pre-crash Safety System (PCS), an Advanced Emergency Braking System (AEB), or the like based on a detection result of the target by the radar apparatus 1.

The transmitting unit 10 includes a signal generating unit 11, an oscillator 12, and a transmitting antenna 13. The signal generating unit 11 is configured to generate a modulation signal for transmitting a millimeter wave frequency-modulated by a triangular wave or the like under control of a transmission and reception control unit 31 (described below). The oscillator 12 is configured to generate a transmitted signal based on the modulation signal generated by the signal generating unit 11 and to output the transmitted signal to the transmitting antenna 13. As shown in FIG. 2, the transmitted signal generated by the oscillator 12 is also distributed to a mixer 22 (described below).

The transmitting antenna 13 is configured to convert the transmitted signal from the oscillator 12 into a transmitted wave and to output the transmitted wave to an outside of the host vehicle MC. The transmitted wave output from the transmitting antenna 13 is a continuous wave frequency-modulated by the triangular wave or the like. The transmitted wave transmitted from the transmitting antenna 13 to the outside of the host vehicle MC, for example, forward is reflected by the target which is the other vehicle LC or the like and becomes the reflected wave. The number of the transmitting antennas 13 shown in FIG. 2 is one, but may be two or more for Multiple Input Multiple Output (MIMO) operation or the like.

The receiving unit 20 includes a plurality of receiving antennas 21 forming an array antenna, a plurality of mixers 22, and a plurality of A/D converting units 23. The mixer 22 and the A/D converting unit 23 are provided for each receiving antenna 21.

Each receiving antenna 21 is configured to receive the reflected wave from the target as the received wave, to convert the received wave into the received signal, and to output the received signal to the mixer 22. The number of the receiving antennas 21 shown in FIG. 2 is three, but may be two or less or four or more.

The received signal output from the receiving antenna 21 is amplified by an amplifier (for example, a low noise amplifier) (not shown) and then input to the mixer 22. The mixer 22 is configured to mix a part of the distributed transmitted signal and the received signal input from the receiving antenna 21, to remove unnecessary signal components, to generate a beat signal, and to output the beat signal to the A/D converting unit 23.

The beat signal is a differential wave of the transmitted wave and the reflected wave, and has a beat frequency which is a difference between a frequency (hereinafter, referred to as a "transmission frequency") of the transmitted signal and a frequency (hereinafter, referred to as a "reception frequency") of the received signal. The beat signal generated by the mixer 22 is converted into a digital signal by the A/D converting unit 23 and then output to the processing unit 30.

The processing unit 30 includes the transmission and reception control unit 31, a signal processing unit 32, and a storage unit 38. The signal processing unit 32 includes an FFT processing unit 33, a peak extracting unit 34, a correcting unit 35, an azimuth calculating unit 36, and a calculating unit 37.

The storage unit 38 is configured to store information related to the correction value H and information including a history of a series of signal processing executed by the signal processing unit 32.

The processing unit 30 is, for example, a microcomputer including a Central Processing Unit (CPU), a Read Only Memory (ROM) corresponding to the storage unit 38, a Random Access Memory (RAM), a register, other input and output ports, or the like, and is configured to control the entire radar apparatus 1.

The CPU of the microcomputer functions as the transmission and reception control unit 31 and the signal processing unit 32 by reading and executing a program stored in the ROM. Both of the transmission and reception control unit 31 and the signal processing unit 32 may be formed by hardware which is an Application Specific Integrated Circuit (ASIC), a Field Programmable Gate Array (FPGA), or the like.

The transmission and reception control unit 31 is configured to control the transmitting unit 10 including the signal generating unit 11 and the receiving unit 20. The signal processing unit 32 is configured to periodically execute a series of signal processing.

The FFT processing unit 33 is configured to perform Fast Fourier Transform (FFT) processing (hereinafter, referred to as "FFT processing") on the beat signal input from each A/D converting unit 23. A result of the FFT processing is a frequency spectrum of the beat signal, and is a power value (a signal level) for each frequency of the beat signal (for each frequency bin set at a frequency interval corresponding to frequency resolution).

The peak extracting unit 34 is configured to extract a peak frequency which is a peak in the result of the FFT processing. In the peak extraction processing, the peak frequency is extracted for each of a "UP section" and a "DN section" of the beat signal. A distance to the target is determined based on the peak frequency. A peak signal of each receiving channel is the received signal s for calculating an azimuth of each target.

The correcting unit 35 is configured to correct the peak frequency extracted by the peak extracting unit 34 based on the correction value H calculated by the calculating unit 37 (described below). The correction unit 35 is configured to correct the received signal s by reading information related to the correction value H from the storage unit 38 and multiplying the received signal s.

Accordingly, the received signal s', in which the error component between the receiving antennas included in the received signal s is corrected, may be obtained. Accordingly, calculation accuracy of azimuth calculation processing by the azimuth calculating unit 36 may be improved.

The azimuth calculating unit 36 is configured to perform angle estimation processing for calculating the azimuth for each peak frequency extracted by the peak extracting unit 34 based on the received signal s' corrected by the correcting unit 35, and to analyze a presence of the corresponding target for each peak frequency.

The azimuth calculation may be performed using a known arrival direction estimation method which is MUSIC, Digital Beam Forming (DBF), Capon, Estimation of Signal Parameters via Rotational Invariance Techniques (ESPRIT), beamformer method, or the like. Next, processing of the calculating unit 37 will be described. The calculating unit 37 is configured to calculate a correction value H for correcting the error component included in the received signal based on the received waves which are received by the receiving unit 20 and whose arrival directions are known, depending on an azimuth of a beam shape of the antenna element based on the received signal. The calculating unit 37 calculates the correction value H, for example, before shipment of the radar apparatus 1.

Figure 3:
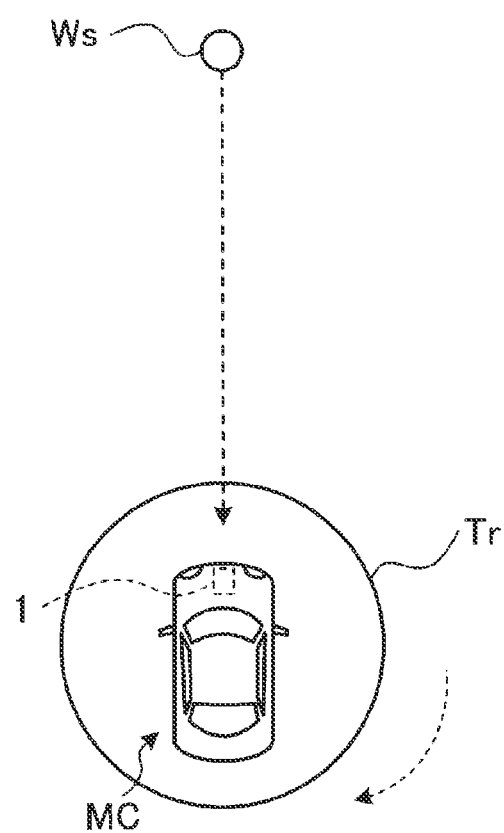
FIG. 3 illustrates an example of a known wave source.

When the calculating unit 37 calculates the correction value H, the receiving unit 20 receives an electromagnetic wave from the known wave source whose arrival direction is known. FIG. 3 illustrates an example of the known wave source. For example, as illustrated in FIG. 3, the radar apparatus 1 receives the electromagnetic wave from a known wave source Ws in a state where the host vehicle MC is on a rotary table Tr.

For example, the rotary table Tr is rotated by a predetermined angle. The electromagnetic waves transmitted from the known wave source Ws is received by the receiving unit 20. The arrival directions of the received signal that is obtained are in predetermined angular increments and are known.

A total number of arrival directions in 10° increments in a left-right direction with reference to a front of the radar apparatus 1 is 15, but may be less than 15 or 16 or more depending on estimation accuracy of a required angle.

The calculating unit 37 calculates the received signal matrix S based on the received signal obtained by each receiving antenna 21 for each arrival direction. Here, when the antenna number n=1, 2, ... N, the known wave source azimuth $\theta=\theta_1, \theta_2, \ldots \theta_M$, and the received signal of the azimuth $\theta$ received by the antenna n is $s_{n\theta}$, the received signal matrix S is represented by the following Equation (3).

$$S = \begin{bmatrix} s_{1\theta_1}/|\overline{s_{\theta_1}}| & \cdots & s_{1\theta_M}/|\overline{s_{\theta_M}}| \\ \vdots & \ddots & \vdots \\ s_{N\theta_1}/|\overline{s_{\theta_1}}| & \cdots & s_{N\theta_M}/|\overline{s_{\theta_M}}| \end{bmatrix} \quad (3)$$

In Equation (3), a denominator in each column is an absolute value of an average value of the received signal S for each column. That is, in Equation (3), the received signal S is normalized by the average amplitude for each column.

Accordingly, only an error between the channels due to the electromagnetic coupling between the elements of each received antenna 21 or the like may be corrected by applying the correction value H ($H=A \cdot S^+$) to the actual received signal S whose arrival direction is unknown.

The calculating unit 37 may calculate the received signal matrix S as Equation (4) instead of Equation (3).

$$S = \begin{bmatrix} s_{1\theta_1}/|\overline{s_{1\theta_1}}| & \cdots & s_{1\theta_M}/|\overline{s_{1\theta_M}}| \\ \vdots & \ddots & \vdots \\ s_{N\theta_1}/|\overline{s_{N\theta_1}}| & \cdots & s_{N\theta_M}/|\overline{s_{N\theta_M}}| \end{bmatrix} \quad (4)$$

In Equation (4), both a numerator and a denominator of each component are the same, so that a gain of each component in the received signal matrix S is "1". That is, when the received signal s is corrected using Equation (4) for the received signal matrix S and the correction value H, a gain difference between the channels is not corrected, and only the phase difference may be corrected. Even in this case, the accuracy of the azimuth calculation may be improved.

Figure 4B:
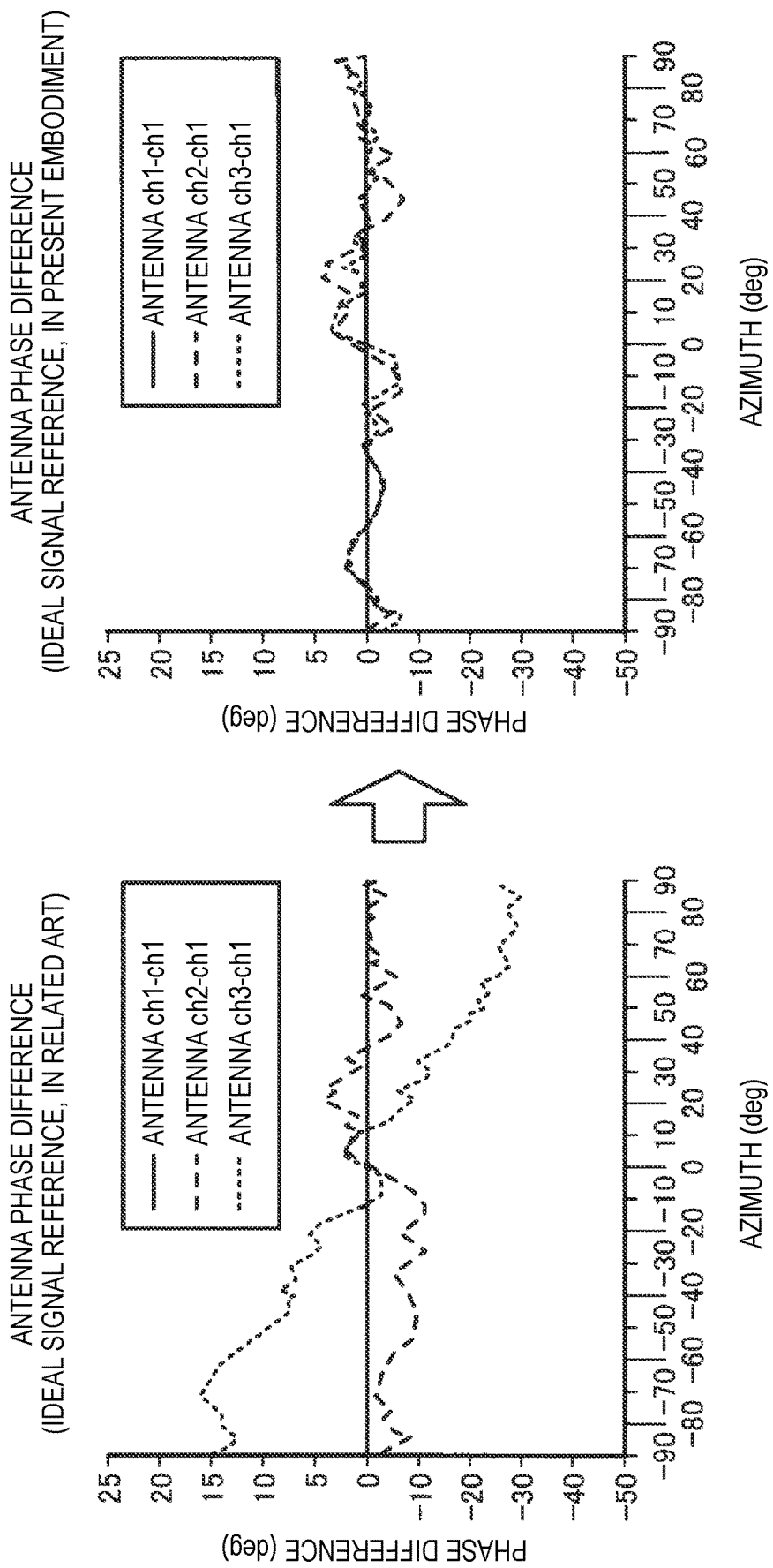
FIG. 4B shows phase differences of the corrected received signals.

Next, the corrected received signal will be described with reference to FIGS. 4A and 4B. FIG. 4A shows gain differences of the corrected received signals. FIG. 4B shows phase differences of the corrected received signals. In the following, the case where the received signal is corrected using Equation (3) is shown.

In FIG. 4A, the respective receiving antennas 21 are ch1 to ch3, and the gain differences of the received signal of ch1 and the received signals of ch2 and ch3 are shown, respectively. As a comparison result, a left diagram in FIG. 4A shows received signals corrected by a related-art correction method (see Equation (1)).

As shown in the left diagram in FIG. 4A, in the related-art correction method, the gain differences of the received signals between the channels are large. However, as shown in a right diagram in FIG. 4A, when the received signals are corrected using the correction value H according to the present embodiment, the gain differences of the received signals between the channels are small.

As shown in a left diagram in FIG. 4B, in the related-art correction method, an error of the phase differences between the channels is large. However, as shown in a right diagram in FIG. 4B, when the received signals are corrected using the correction value H according to the present embodiment, the error of the phase differences between the channels is small.

That is, in the present embodiment, the received signals received by the channels may be brought close to ideal signals as compared with that in the related art, so that the accuracy of the azimuth calculation may be improved as compared with that in a case of using the related-art correction processing.

Figure 5:
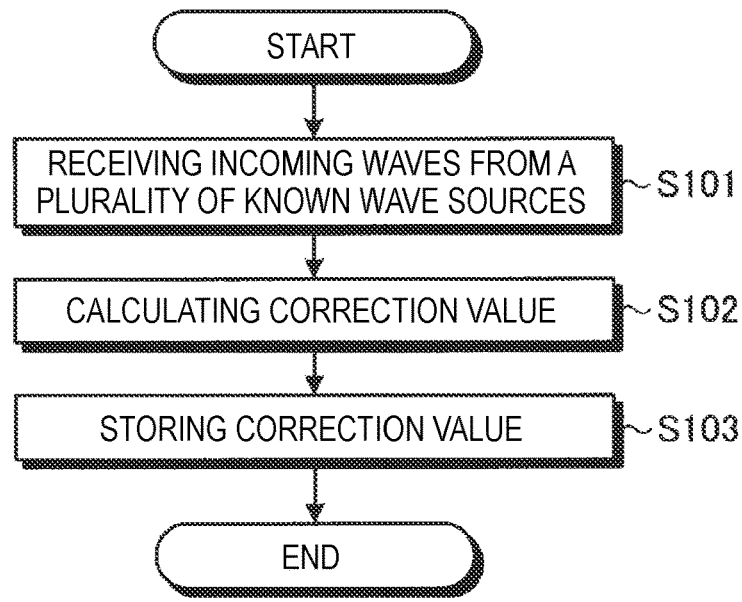
FIG. 5 is a flowchart (part 1) showing a processing procedure executed by the radar apparatus.
Figure 6:
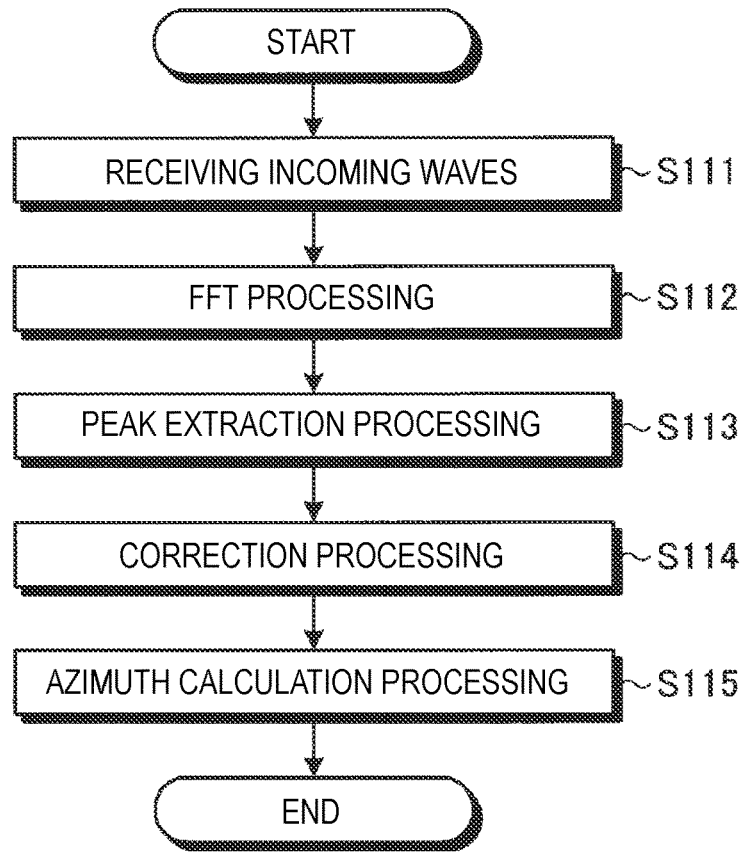
FIG. 6 is a flowchart (part 2) showing a processing procedure executed by the radar apparatus.

Next, a processing procedure executed by the radar apparatus 1 according to the embodiment will be described with reference to FIGS. 5 and 6. FIGS. 5 and 6 are flowcharts showing the processing procedure executed by the radar apparatus 1.

First, calculation processing of the correction value H will be described with reference to FIG. 5. As shown in FIG. 5, when receiving incoming waves from the plurality of known wave sources (step S101), the radar apparatus 1 calculates the correction value H based on the received signals based on the received waves (step S102).

Subsequently, the radar apparatus 1 stores the correction value H calculated in step S102 (step S103), and ends the processing.

Next, the processing procedure executed by the radar apparatus 1 in an actual environment will be described with reference to FIG. 6. As shown in FIG. 6, first, when receiving the incoming waves (step S111), the radar apparatus 1 performs the FFT processing (step S112).

Subsequently, the radar apparatus 1 performs the peak extraction processing based on the result of the FFT processing (step S113), and performs the correction processing for correcting the received signal (step S114). After that, the radar apparatus 1 performs the azimuth calculation processing using the corrected received signal (step S115), and ends the processing.

As described above, the radar apparatus 1 according to the embodiment includes the receiving unit 20 and the calculating unit 37. The receiving unit 20 includes the plurality of receiving antennas 21 formed of the antenna elements, and receives the incoming waves whose arrival direction are known. The calculating unit 37 calculates the correction value H for correcting the error component included in the received signal of the incoming waves received by the receiving unit 20, depending on the azimuth of the antenna element based on the received signal. Accordingly, the accuracy of the azimuth calculation may be improved by the radar apparatus 1 according to the embodiment.

In the above-described embodiment, a case where the correction value H is calculated by the radar apparatus 1 has been described, but the present invention is not limited thereto. The correction value H may be calculated by an external terminal of the radar apparatus 1.

Figure 7:
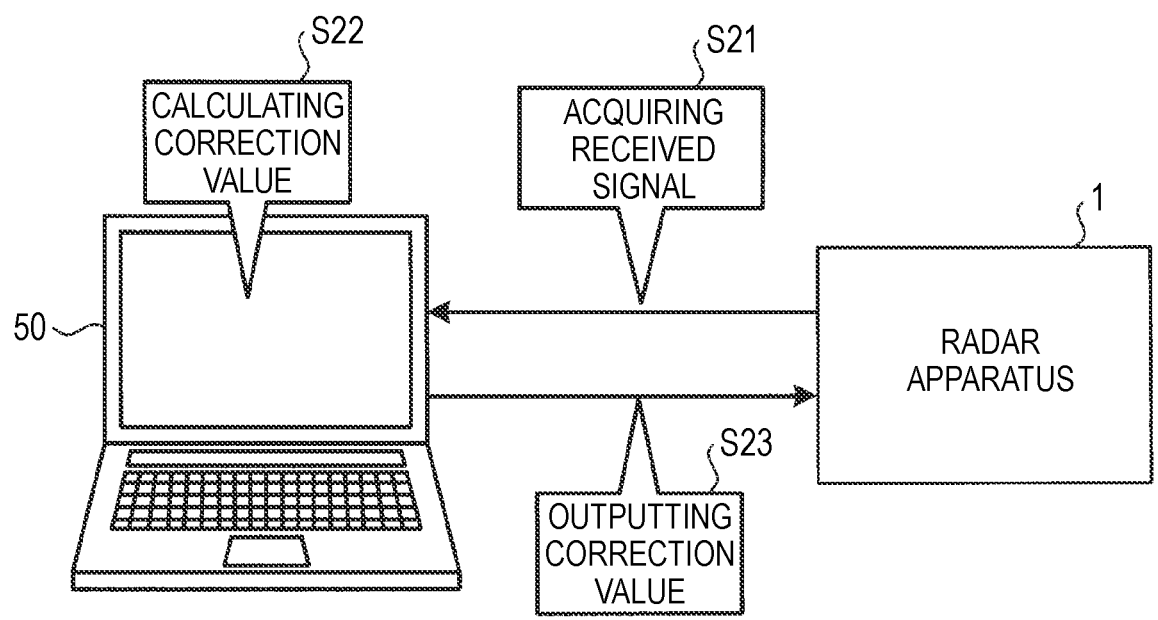
FIG. 7 illustrates an example of an external terminal.

FIG. 7 illustrates an example of the external terminal. As illustrated in FIG. 7, an external terminal 50 is an information processing apparatus which is a notebook PC or the like. For example, the external terminal 50 is configured to communicate with the radar apparatus 1 via a communication cable (not illustrated).

In this case, for example, when the external terminal 50 acquires the received signal based on the known wave source from the radar apparatus 1 (step S21), the external terminal 50 calculates the correction value H based on the received signal (step S22).

Then, the external terminal 50 outputs the correction value H calculated in step S22 to the radar apparatus 1 (step S23). Accordingly, the radar apparatus 1 stores the correction value H calculated by the external terminal 50 in the storage unit 38.

Accordingly, when the correction value H is calculated by the external terminal 50, software for calculating the correction value H may be installed in the external terminal 50, and is not necessary for the radar apparatus 1. Accordingly, software to be installed in the radar apparatus 1 may be reduced.

In the above-described embodiment, a case where the received signal matrix S is normalized by the average amplitude and a case where the gain of each component is "1" has been described, but the present invention is not limited thereto. That is, the same correction may be performed on the matrix A indicating the ideal signal.

That is, if the finally obtained correction value H is the same, either the received signal matrix S or the ideal signal matrix A may be corrected.

Further, in the above-described embodiment, a case where a predetermined number of the known wave sources are in a plane direction with respect to the radar apparatus 1 has been described, but the known wave sources may be in an upper-lower direction with respect to the radar apparatus 1. In this case, accuracy of azimuth calculation in the upper-lower direction may be improved by the correction value H.

The correction value calculation method according to the present embodiment is not limited to the radar apparatus 1, and may be applied to all antennas including an anisotropic antenna. The radar apparatus 1 may be installed not only in a vehicle but also in a place other than a vehicle.

Additional effects and modifications may be easily derived by those skilled in the art. Therefore, broader aspects of the present invention are not limited to the specific details and the representative embodiment shown and described above. Accordingly, various modifications may be attained without departing from the spirit or the scope of the general inventive concept as defined by the appended claims and equivalents thereof.

What is claimed is:

1. A radar apparatus comprising:
a receiving unit including a plurality of receiving antennas including an antenna element, and configured to receive incoming waves whose arrival directions are known; and
a calculating unit configured to calculate a correction value for correcting an error component included in a received signal of the incoming waves received by the receiving unit based on the received signal, the correction value being depending on an azimuth of the antenna element, wherein
the calculating unit is configured to calculate an inner product of a pseudo inverse matrix of a received signal matrix indicating the received signal of each receiving antenna for each arrival direction and a matrix indicating an ideal received signal as the correction value, and to calculate the received signal matrix such that the received matrix is normalized by an average amplitude of the received signal for each arrival direction.

2. A radar apparatus comprising:
a receiving unit including a plurality of receiving antennas including an antenna element, and configured to receive incoming waves whose arrival directions are known; and
a calculating unit configured to calculate a correction value for correcting an error component included in a received signal of the incoming waves received by the receiving unit based on the received signal, the correction value being depending on an azimuth of the antenna element,
wherein the calculating unit is configured to calculate an inner product of a pseudo inverse matrix of a received signal matrix indicating the received signal of each receiving antenna for each arrival direction and a matrix indicating an ideal received signal as the correction value, and to calculate the received signal matrix such that a gain of each component of the received signal matrix is 1.

3. A correction value calculation method comprising:
receiving incoming waves whose arrival directions are known with a plurality of receiving antennas including an antenna element;
calculating a correction value for correcting an error component included in a received signal based on the incoming waves received based on the received signal, the correction value being depending on an azimuth of the antenna element; and
calculating an inner product of a pseudo inverse matrix of a received signal matrix indicating the received signal of each receiving antenna for each arrival direction and a matrix indicating an ideal received signal as the correction value, and to calculating the received signal matrix such that the received matrix is normalized by an average amplitude of the received signal for each arrival direction.

4. A correction value calculation method comprising:
receiving incoming waves whose arrival directions are known with a plurality of receiving antennas including an antenna element;
calculating a correction value for correcting an error component included in a received signal based on the incoming waves received based on the received signal, the correction value being depending on an azimuth of the antenna element; and
calculating an inner product of a pseudo inverse matrix of a received signal matrix indicating the received signal of each receiving antenna for each arrival direction and a matrix indicating an ideal received signal as the correction value, and to calculating the received signal matrix such that a gain of each component of the received signal matrix is 1.

* * * * *